Dec. 11, 1928.
J. H. HAMMOND, JR
1,694,655
SYSTEM AND METHOD OF PRODUCTION AND RECEPTION
OF CONTINUOUS OSCILLATIONS
Original Filed March 31, 1914
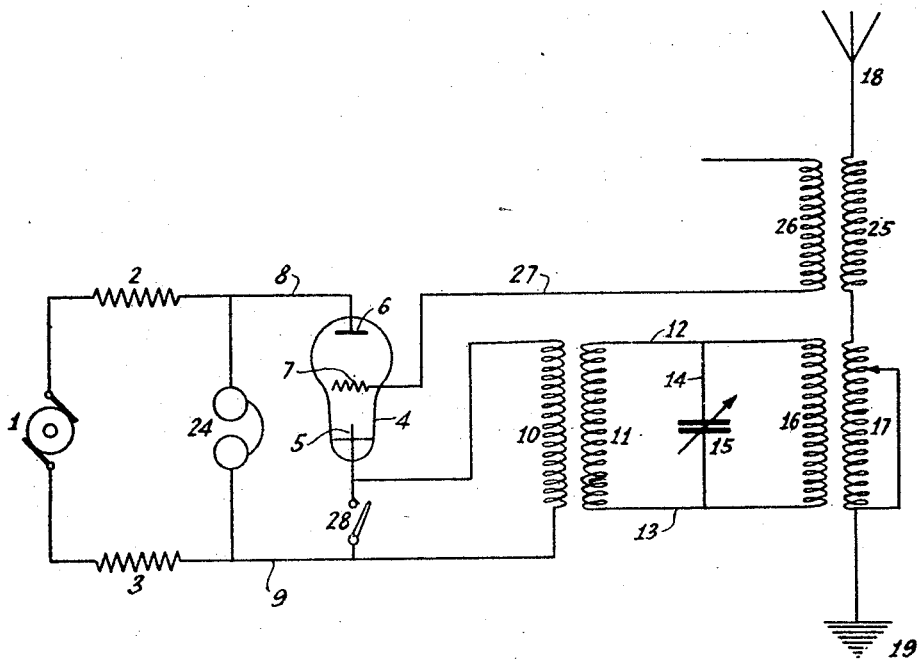
INVENTOR
JOHN HAYS HAMMOND JR.
BY
*Ira J Adams*
ATTORNEY Patented Dec. 11, 1928.

1,694,655

UNITED STATES PATENT OFFICE.

JOHN HAYS HAMMOND, JR., OF GLOUCESTER, MASSACHUSETTS.

SYSTEM AND METHOD OF PRODUCTION AND RECEPTION OF CONTINUOUS OSCILLATIONS.

Original application filed March 31, 1914, Serial No. 828,605. Renewed July 1, 1921, Serial No. 481,930. Divided and this application filed January 9, 1923. Serial No. 80,162.

This invention relates to a system and method for the production or reception of undamped and continuous oscillations of high frequency and for the production of electro-magnetic waves such as described in my copending application Ser. No. 481,930 filed July 1, 1921, renewal of Serial No. 828,605, filed March 31, 1914, of which this application is a division. The object of this invention is to provide a means for the transmission and reception of undamped continuous oscillations from and upon the same system.

In order that the principle of the invention may be readily understood, I shall describe certain embodiments of apparatus for carrying out my system and for practicing my method.

Referring more particularly to the figure and to the system shown therein, I have therein represented a generator of direct current at 1, this generator being of any suitable type or character. I preferably provide choke coils at 2, 3 and at 4 I provide what I herein designate as a high frequency electric valve. This so-called "valve" is a suitable chamber, container or bulb, preferably containing a rarefied gas such for example as mercury vapor. Although I am not limited to the use of such vapor, the said valve is herein represented as similar in construction to the so-called audion, a detector of the vacuum or gaseous type. Said container or valve has suitably mounted therein a steel or other suitable bar or point 5 constituting a cathode and which may be in a mercury bath; a plate 6 constituting an anode and a grid 7 or potential gradient changing means whereon a charge may accumulate as hereinafter set forth, thereby to change the potential gradient between the cathode and anode. The said cathode and anode are in circuit with the conductors 8, 9 leading from the choke coils. Said conductors are provided with a switch 28 and a coil 10 constituting the primary of an oscillatory transformer. The secondary coil of said transformer is indicated at 11 and leading therefrom are conductors 12, 13 connected by a so-called "fly wheel circuit" or storage circuit 14 having therein a condenser 15. The said conductors 12, 13 are provided with a coil 16 constituting a member of a second oscillatory transformer. The circuit including the primary coil 16 of said oscillatory transformer is inductively connected to a second coil 17, forming a portion of the open transmitting carrier or resonating circuit 18 connected to earth at 19. At 24 I have indicated telephones suitable to withstand the large amount of current that will be used in this system. It will, moreover, be observed that the primary winding 10 is normally in circuit with the cathode 5, the direct current generator and the plate or anode 6. The aerial or resonating circuit is provided with a variable inductance coil 17 and also with a coil 25 which is inductively connected to a coil 26 connected by conductor 27 with the grid 7. A switch 28 is arranged in such a manner that when it is closed, the primary winding 10 will be short-circuited or cut out, but when it is open, the primary winding 10 will be effective.

Each alternation of the current in the open aerial circuit 17, 25 tends to produce a change of potential of the grid 7 through the action of the transformer 25, 26. This change of potential on the grid 7 in turn controls the flow of direct current through the so-called electric valve 4. When the switch 28 is open, this will cause an interrupted direct current flow through the primary winding of the transformer 10, which will produce alternating currents in the "fly wheel circuit" 14, 15, 16 which will co-act on the aerial 17, said circuit in turn reacting upon the grid either through the action of the transformer or through electro-static action. When it is desired to utilize the system for receiving instead of for transmitting signals, the switch 28 is closed thus short-circuiting or cutting out the primary transformer winding 10 and consequently rendering the "fly wheel circuit" 14, 15 ineffective. In this condition of the system, the telephones 24 are connected in shunt through the switch 28 with the "valve" or detector 4 and when the signal of the radiant energy is received by the open aerial circuit 25, the voltage on the grid 7 will be varied through the responsive action of the coil 26 and this will cause a variation in the current passing through the detector 4, the effects of which may be readily heard in the telephone 24.

From the foregoing description, it will be evident that I have provided a system and have disclosed a method for the production and reception of undamped and continuous electric oscillations of high frequency for the production of electro-magnetic waves. Although I have disclosed certain embodiments of apparatus constituting this system it will be evident that other types of apparatus may be employed for this purpose and that I am not limited in the practice of my method to the employment of those forms of systems herein represented.

Having thus described one illustrative embodiment of my invention, I desire it to be understood that all those specific terms employed are used in a generic and descriptive sense and not for purposes of limitations, the scope of the invention being set forth in the following claims:

1. A system for transmitting or receiving electroradiant oscillations, comprising an aerial circuit, a detector, and means operatively connecting said aerial circuit to said detector and adjustable to render said detector either operative to cause said aerial circuit to generate a continuous series of undamped electroradiant oscillations while said circuit is not being acted upon by electroradiant energy, or to render said detector inoperative to cause said aerial circuit to radiate electrical oscillations but operative to detect electroradiant oscillations received by said aerial circuit.

2. Means for sustaining high frequency electric oscillations, comprising a source of electric energy, a circuit energized from said source, a detector controlling said circuit, and an oscillatory circuit operatively connected to said detector to control the same, and operatively connected to said first mentioned circuit to be controlled thereby, whereby continuous electric oscillations are produced in said oscillatory circuit, and means to cause said oscillatory circuit to become inoperative and to cause said detector to receive electroradiant signals.

3. A system for transmitting or receiving electroradiant oscillations, comprising a source of electric energy, a circuit energized from said source, a detector controlling said circuit, an aerial circuit operatively connected to said detector to control the same, and operatively connected to said first mentioned circuit to be controlled thereby, and means operative to render said first mentioned circuit inoperative to control said open aerial circuit, whereby said detector may be operated selectively either to detect electroradiant oscillations received by said aerial circuit, or to cause said aerial circuit to emit a series of undamped electroradiant oscillations while not receiving electroradiant oscillations.

4. A system for transmitting or receiving electroradiant oscillations, comprising a source of electric energy, a circuit energized from said source, a detector controlling said circuit, an aerial circuit operatively connected to said detector to control the same and operatively connected to said first mentioned circuit to be controlled thereby, and means including a switch operative to render said first mentioned circuit inoperative to control said open aerial circuit, whereby said detector may be operated selectively either to detect electroradiant oscillations received by said aerial circuit or to cause said aerial circuit to emit a series of undamped electroradiant oscillations while not receiving electroradiant oscillations.

5. A system for transmitting or receiving electroradiant oscillations comprising a source of electric energy, a circuit energized from said source, a detector controlling said circuit, a circuit arranged to control said detector, an oscillatory circuit arranged to be controlled by said first-mentioned circuit and to control said second mentioned circuit, and means for short-circuiting a portion of said first mentioned circuit to render said first mentioned circuit inoperative to control said oscillatory circuit.

6. A system for transmitting or receiving electroradiant oscillations, comprising a source of electric energy, a circuit energized from said source, a detector controlling said circuit, a circuit arranged to control said detector, an oscillatory circuit arranged to be controlled by said first mentioned circuit and to control said second mentioned circuit, and means including a switch for short-circuiting a portion of said first mentioned circuit to render said first mentioned circuit inoperative to control said oscillatory circuit.

7. A system for transmitting or receiving electroradiant oscillations comprising a source of electric energy, a circuit energized thereby and including an inductance, a detector controlling said circuit, a circuit controlling said detector, an oscillatory circuit operatively connected to said second mentioned circuit and to said inductance, and means for short-circuiting said inductance.

8. A system for transmitting or receiving electroradiant oscillations, comprising a source of electric energy, a circuit energized thereby and including an inductance, a detector controlling said circuit, a circuit controlling said detector, an open aerial circuit operatively connected to said second mentioned circuit and to said inductance, and means for short-circuiting said inductance.

9. A system for transmitting or receiving electroradiant oscillations, comprising an aerial circuit, a three electrode vacuum tube detector and means operatively connecting said aerial circuit with said tube and adjustable to render said tube either operative to cause said aerial circuit to generate continuous series of undamped electroradiant oscillations while said circuit is not being acted upon by electroradiant energy, or to render said detector inoperative to cause said aerial circuit to radiate electrical oscillations but operative to detect electrical oscillations received by said aerial circuit.

10. A system for transmitting or receiving electroradiant oscillations, comprising a source of electric energy, a circuit energized from said source, a three electrode vacuum tube controlling said circuit, an aerial circuit operatively connected to said vacuum tube to control the same, and operatively connected to said first mentioned circuit to be controlled thereby, and means including a switch operative to render said first mentioned circuit inoperative to control said open aerial circuit, whereby said vacuum tube may be operated selectively either to detect electroradiant oscillations received by said aerial circuit or to cause said aerial circuit to emit a series of undamped electroradiant oscillations while not receiving electroradiant oscillations.

11. A system for transmitting or receiving electroradiant oscillations, comprising a source of electric energy, a circuit energized thereby and including an inductance, a three electrode vacuum tube controlling said circuit, a circuit controlling said vacuum tube, an open aerial circuit operatively connected to said second mentioned circuit and to said inductance, and means for short-circuiting said inductance.

JOHN HAYS HAMMOND, Jr.